(12) United States Patent
Schimke

(10) Patent No.: US 7,198,130 B2
(45) Date of Patent: Apr. 3, 2007

(54) V-DRIVE MOTOR ARRANGEMENT

(75) Inventor: Martin Schimke, Redgranite, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 179 days.

(21) Appl. No.: 10/952,363

(22) Filed: Sep. 28, 2004

(65) Prior Publication Data

US 2006/0070788 A1 Apr. 6, 2006

(51) Int. Cl.
*B60K 5/00* (2006.01)

(52) U.S. Cl. .................................. 180/291; 180/65.1

(58) Field of Classification Search ............. 180/55, 180/56, 58, 291, 65.1, 65.6
See application file for complete search history.

(56) References Cited

U.S. PATENT DOCUMENTS

| | | | |
|---|---|---|---|
| 718,097 A * | 1/1903 | Crompton | 180/303 |
| 1,481,405 A * | 1/1924 | Anglada | 180/57 |
| 1,543,044 A * | 6/1925 | Anglada | 180/65.6 |
| 1,735,404 A * | 11/1929 | Masury | 180/65.6 |
| 2,077,452 A * | 4/1937 | Wren | 180/69.6 |
| 2,317,324 A * | 4/1943 | Wolf | 180/69.6 |
| 3,265,147 A * | 8/1966 | Coordes | 180/62 |
| 3,534,825 A * | 10/1970 | Reffle | 180/252 |
| 3,966,178 A | 6/1976 | Stevens | |
| 4,270,622 A * | 6/1981 | Travis | 180/65.4 |
| 4,320,814 A | 3/1982 | Middelhoven | |
| 4,597,555 A | 7/1986 | Weihsmann | |
| 4,754,956 A | 7/1988 | Barone et al. | |
| 4,917,200 A * | 4/1990 | Lucius | 180/6.2 |
| 5,220,231 A | 6/1993 | Veronesi et al. | |
| 5,252,875 A | 10/1993 | Veronesi et al. | |
| 5,311,633 A | 5/1994 | Herzog et al. | |
| 5,558,174 A * | 9/1996 | Avitan et al. | 180/60 |
| 5,580,287 A | 12/1996 | Wieringa | |
| 5,782,133 A | 7/1998 | Kullborg | |
| 5,878,830 A | 3/1999 | Ruppert et al. | |
| 5,924,504 A * | 7/1999 | Ruppert et al. | 180/61 |
| 6,062,328 A | 5/2000 | Campbell et al. | |
| 6,129,166 A | 10/2000 | Sueshige et al. | |
| 6,276,474 B1 * | 8/2001 | Ruppert et al. | 180/65.6 |
| 6,544,009 B2 | 4/2003 | Makino et al. | |
| 6,948,576 B2 * | 9/2005 | Angeles | 180/23 |
| 7,028,583 B2 * | 4/2006 | Bennett | 74/661 |

* cited by examiner

*Primary Examiner*—Christopher P. Ellis
*Assistant Examiner*—Brian Swenson
(74) *Attorney, Agent, or Firm*—Foley & Lardner LLP

(57) ABSTRACT

A V-drive motor arrangement for a motor vehicle, with the motor vehicle including a pair of frame members maintained in a spaced apart relationship. The V-drive motor arrangement includes a first motor mounted between the two frame members and coupled to a first gear set. A second motor is mounted between the two frame members and coupled to a gear set. Each motor is aligned with each respective gear set at a gear mesh angle other than 90°. Another embodiment of the V-drive motor arrangement includes the motors mounted at an angle relative to the horizontal plane of the frame members. Each gear set can be a bevel gear set.

19 Claims, 2 Drawing Sheets

V-DRIVE MOTOR ARRANGEMENT

FIELD

The present invention relates generally to vehicles, and more particularly to a configuration of at least two electric motors mounted between frame members of the vehicle support structure.

BACKGROUND

Conventional vehicles utilizing electric motors for propulsion typically couple the electric motor and associated control devices to a wheel set mounted between the frame members of the vehicle support structure. Due to vehicle space constraints and the required electric motor sizes, parallel shaft and/or right angle gear box arrangements can be used. However, it is more typical to use multiple gear meshes and supporting shaft and bearings in order to accommodate the electric motors within the frame parameters. Additional restrictions in such vehicles include suspension members particularly of the independent suspension type members.

Size restrictions of the overall vehicle, are particularly stringent in military type vehicles that have to be configured to load and unload in an aircraft such as a C130.

Thus there is a need for electric motor arrangement for mounting between frame members of the vehicle support structure that reduces the number of components (shafts, gears and bearings) and provide a power transmission path with only one gear mesh. There is also a need for a motor arrangement that allows multiple large electric motors to fit tight space constraints while maximizing mechanical efficiency. There is also a need for an electric motor configuration that can be mounted in a modular axle apparatus.

SUMMARY OF THE INVENTION

There is provided a V-drive motor arrangement for a motor vehicle, with the motor vehicle including a pair of frame members maintained in a spaced apart relationship. The V-drive motor arrangement includes a first motor mounted between the two frame members and coupled to a first gear set. A second motor is mounted between the two frame members and coupled to a gear set. Each motor is aligned with each respective gear set at a gear mesh angle other than 90°. Another embodiment of the V-drive motor arrangement includes the motors mounted at an angle relative to the horizontal plane of the frame members. Each gear set can be a bevel gear set.

There is further provided a V-drive motor arrangement. The motor arrangement includes a first frame member and a second frame member disposed a spaced apart distance from the first frame member in a substantially parallel relationship. A first motor is mounted between the two frame members and coupled to a first gear set. A second motor is mounted between the two frame members and coupled to a second gear set. Each motor is aligned with each respective gear set at a gear mesh angle other than 90°.

There is further provided a method for mounting a pair of electric motors on a hybrid electric vehicle, with the vehicle including two frame members maintained in a spaced apart relationship. The method comprises the steps of mounting a first electric motor between the two frame members and coupling the first electric motor to a first gear set. Mounting a second electric motor between the two frame members a spaced apart distance from the first electric motor and coupling the second electric motor to a second gear set. Aligning each motor with each respective gear set at a gear mesh angle other than 90°.

DETAILED DESCRIPTION OF THE EXEMPLARY EMBODIMENTS

Figure 1:
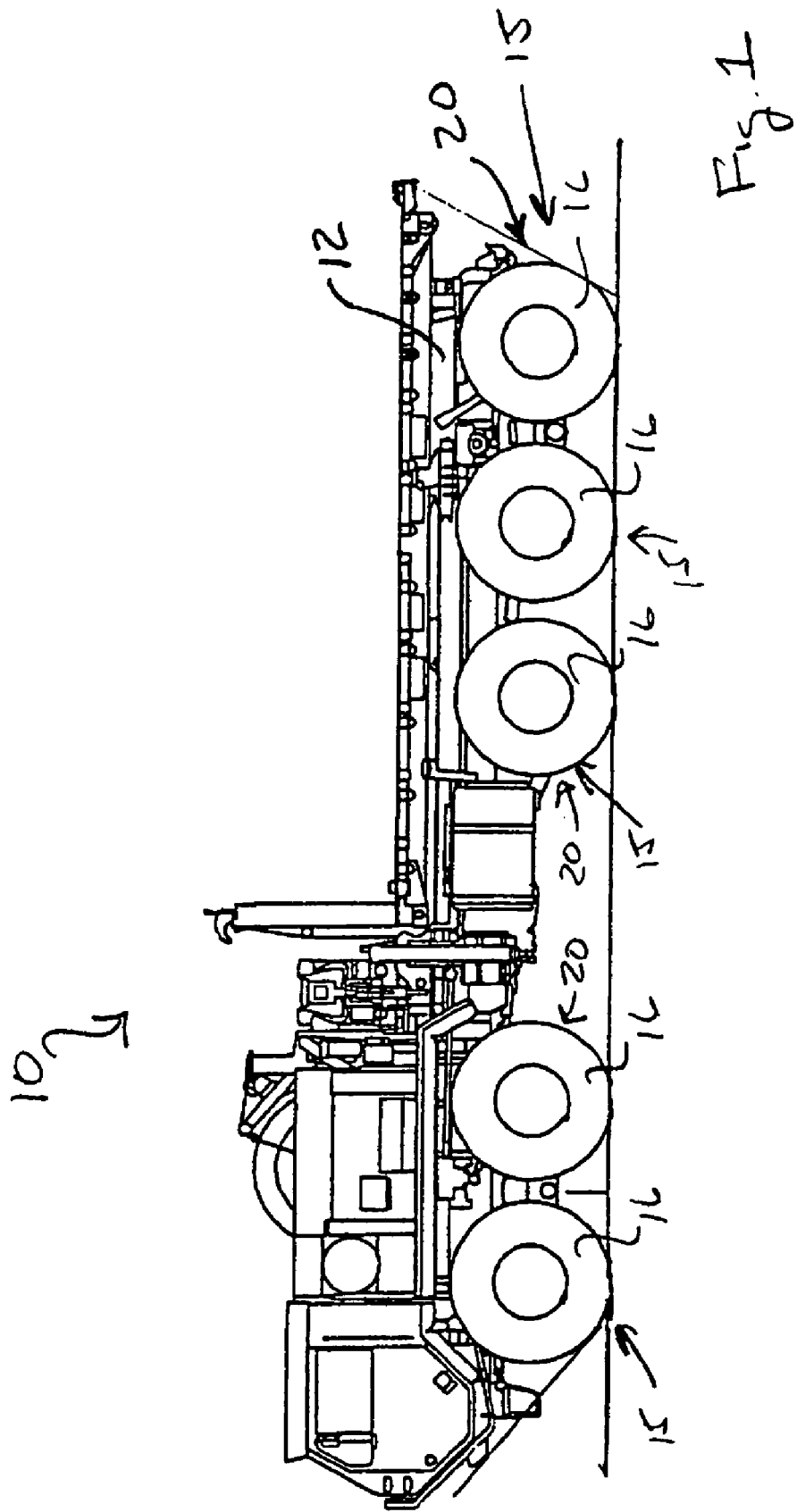
FIG. 1 is a side view of an exemplary embodiment of a vehicle including a V-drive motor arrangement mounted between the frame members of the vehicle and coupled to a wheel set.

A vehicle 10 is illustrated in FIG. 1 and includes a vehicle platform or a vehicle support structure which includes a pair of frame members 12 maintained in a parallel, spaced apart relationship. The support structure is also referred to as a vehicle chassis to which various components and equipment are mounted. An exemplary embodiment of a vehicle 10 is a hybrid electric vehicle which includes a principle power unit mounted on the vehicle support structure. A power storage unit can be mounted on the vehicle support structure with a plurality of wheels rotably mounted on the vehicle platform with an electric motor coupled to each wheel 16. A wheel set 15 typically is a wheel mounted on each side of the vehicle support structure. A drive controller is coupled to the electric motor and a vehicle controller with input terminals and output terminals coupled to the drive controller and to a data bus network mounted in the vehicle 10. The vehicle controller receives data input from monitors and sensors as well as from operator input from an operator input terminal typically located in the cab of the vehicle 10. The speed and power requirements for the vehicle 10 operations are monitored and controlled by the vehicle controller. The torque output of each motor is adjusted to meet the requirements established in the vehicle controller from such data input.

Space constraints between the frame members 12 of the vehicle support structure limit the size of the electric motor and associated gear trains. Additional components such as an independent suspension system and wheel tire restrictions further limit the size and placement of the electric motors utilized for traction of the vehicle 10.

A V-drive motor arrangement 20 for the vehicle 10 provides a first motor 22 mounted between the two frame members 12 with the first motor 22 coupled to a first gear set 24. A second motor 30 is mounted between the two frame members 12 and is coupled to a second gear set 32. Each motor 22, 30 is aligned with each respective gear set 24, 32 at a gear mesh angle other than 90°. (See FIG. 2.)

Figure 2:
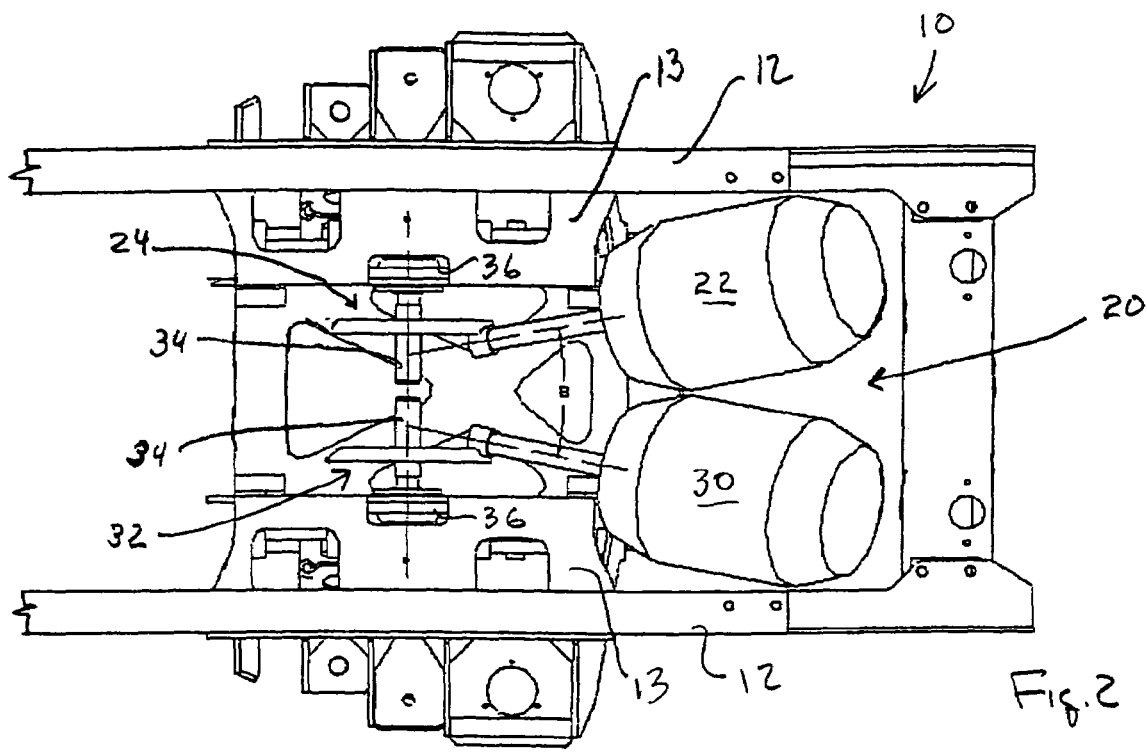
FIG. 2 is a partial top view of an exemplary embodiment of a V-drive motor arrangement for a motor vehicle, with each motor mounted at a gear mesh angle other than 90° and coupled to an output shaft.
Figure 3:
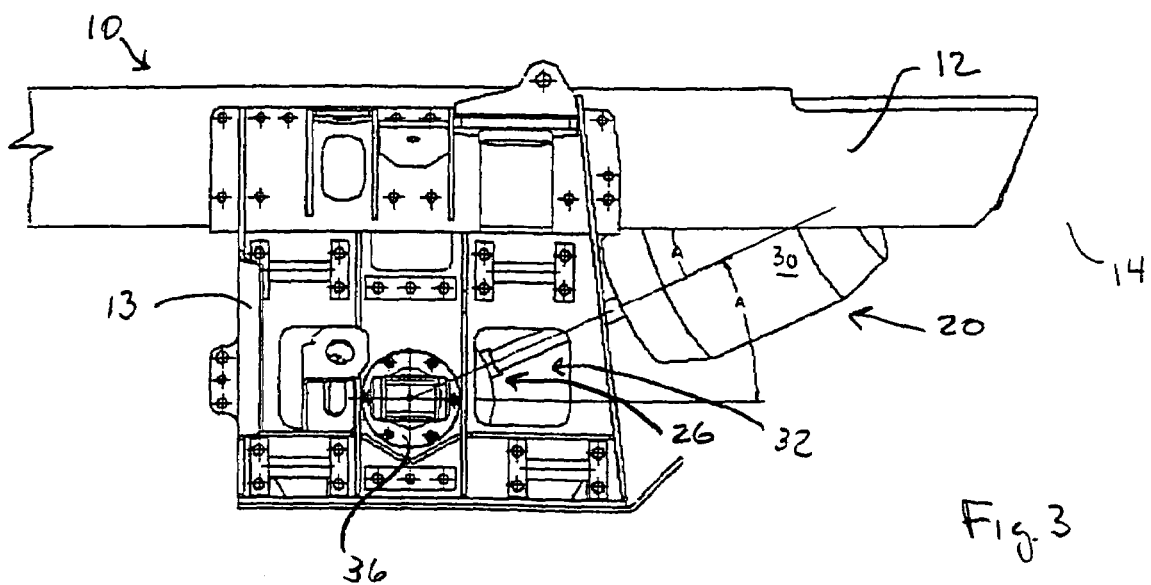
FIG. 3 is a partial side view of the drive motor arrangement illustrated in FIG. 2.

As seen in FIG. 2, the two electric motors 22, 30 are positioned in a "V" pattern with an angle between the motors designated as angle B. The angle B between the two motors is dependent upon the distance between the frame members 12 and the size of the electric motors 22, 30 that are selected by the designer and manufacturer of the vehicle 10. For purposes of this application, the gear mesh angle is defined as 90° less one-half the angle B for a given design.

Each gear set 24, 32 can be, for example, a bevel gear set 26. The bevel gear set 26 can be housed inside a drive axle assembly, for example, for a hybrid drive axle assembly. The bevel gear set 26 receives as input the rotational mechanical energy from the electric motor 26, 30 and applies that energy to an output shaft 34. The output shaft 34 can be coupled to a wheel set 15 or to individual wheels 16 or to such other apparatus as selected by an operator, for example, a power-take-off apparatus. The bevel gear set 26 can further provide rotational mechanical energy as an output to a continuation of a drive shaft or other energy transferring apparatus.

The electric motors 22, 30 can be mounted in a side-by-side arrangement as illustrated in FIG. 2. It is also determined that the motors 22, 30 can be mounted at an angle relative to the horizontal plane 14 of the frame members 12. Such configuration allows the motors to clear other components of the vehicle 10 such as side plates 13 and provide under vehicle clearance. An advantageous angle for placement of the motors 22, 30 relative to the horizontal plane 14 of the frame members 12 is in the range of 18° to 24° inclusive.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

Although the present arrangement has been described with reference to exemplary embodiments, those skilled in the arts will recognize the changes may be made in form an detail without departing from the spirit and scope of the system. It is contemplated that conventional and convenient means of mounting the motors to the vehicle support platform will be utilized.

The foregoing description of embodiments has been presented for purposes of illustration and description. It is not intended to be exhaustive or to be limited to the precise form disclosed. Modifications and variations are possible in light of the above teachings or may be acquired from practice of the invention. The embodiment were chosen and described in order to explain the principals of the V-drive motor arrangement and the practical application to enable one skilled in the art to utilize the invention in various embodiments and with various modifications as are suited to the particular use contemplated. For example, the V-drive motor arrangement can be applied to a non-vehicle platform with the output shaft coupled to a force transferring apparatus and a tool. It is intended that the scope of the invention be defined by the claims appended hereto and their equivalents.

What is claimed is:

1. A V-drive motor arrangement for a hybrid electric vehicle, comprising:
    a support structure on the hybrid electric vehicle, including a pair of frame members maintained in a spaced apart relationship;
    a principle power unit mounted on the support structure;
    a controller coupled to the principle power unit;
    a first motor mounted between the two frame members and coupled to a first gear set and to the controller; and
    a second motor mounted between the two frame members and coupled to a second gear set and to the controller,
    wherein each motor is mounted at a first angle relative to a horizontal plane and a second angle relative to a vertical plane, and each motor is aligned with each respective gear set at a gear mesh angle other than ninety degrees.

2. The motor arrangement of claim 1, wherein each gear set is a bevel gear set.

3. The motor arrangement of claim 1, wherein the motors are mounted side-by-side.

4. The motor arrangement of claim 1, further comprising sensors mounted on the hybrid electric vehicle, the sensors operable to provide data input to the controller for adjusting an output to the motors.

5. The motor arrangement of claim 4, wherein the first angle is in the range of 18° to 24° inclusive.

6. The motor arrangement of claim 1, wherein each gear set is coupled to an output shaft.

7. A V-drive motor arrangement for a hybrid electric vehicle, comprising:
    a support structure on the hybrid electric vehicle;
    a principle power unit mounted on the support structure;
    a controller coupled to the principle power unit;
    a first frame member;
    a second frame member disposed a spaced apart distance from the first frame member in a substantially parallel relationship;
    a first motor mounted between the two frame members and coupled to the controller and to a first gear set;
    a second motor mounted between the two frame members and coupled to a controller and to a second gear set,
    a plurality of sensors mounted on the hybrid electric vehicle, the sensors operable to provide data input to the controller for adjusting an output to the motors;
    wherein each motor is mounted at a first angle relative to a horizontal plane and a second angle relative to a vertical plane, and each motor is aligned with each respective gear set at a gear mesh angle other than ninety degrees.

8. The motor arrangement of claim 7, wherein each gear set is a bevel gear set.

9. The motor arrangement of claim 7, wherein the motors are mounted side-by-side.

10. The motor arrangement of claim 7, further comprising a data bus network mounted in the hybrid electric vehicle, the data bus network configured to receive input data from the sensors and provide output data to the controller.

11. The motor arrangement of claim 10, wherein the first angle is in the range of 18° to 24° inclusive.

12. The motor arrangement of claim 7, wherein each gear set is coupled to an output shaft.

13. The motor arrangement of claim 12, wherein each output shaft is coupled to a wheel set.

14. A method for mounting a pair of electric motors on a hybrid electric vehicle, the method comprising the steps of:
    providing a hybrid electric vehicle having a support structure and a vehicle controller, the support structure having a principle power unit mounted thereon, and including two frame members maintained in a spaced apart relationship;
    mounting a first electric motor between the two frame members;
    coupling the first electric motor to the vehicle controller and to a first gear set;
    mounting a second electric motor between the two frame members a spaced apart distance from the first electric motor;

coupling the second electric motor to the vehicle controller and to a second gear set;

mounting a plurality of sensors on the hybrid electric vehicle, the sensors operable to provide data input to the vehicle controller for adjusting an output to the motors;

aligning each motor at a first angle relative to a horizontal plane and a second angle relative to a vertical plane; and aligning each motor with each respective gear set at a gear mesh angle other than 90°.

15. The method of claim 14, including a step of coupling each gear set to an output shaft.

16. The method of claim 14, including the step of providing a data bus network in the hybrid electric vehicle, the data bus network configured to receive input data from the sensors and to provide output data to the vehicle controller.

17. The method of claim 16, wherein the angle is in a range of 18° to 24° inclusive.

18. The method of claim 14, wherein each gear set is a bevel gear set.

19. The method of claim 15, including the step of coupling each output shaft to a wheel set.

* * * * *